United States Patent
Choi et al.

(10) Patent No.: US 7,876,269 B2
(45) Date of Patent: Jan. 25, 2011

(54) RADIO FREQUENCY IDENTIFICATION TAG ANTENNA USING PROXIMITY COUPLING FOR ATTACHING TO METAL

(75) Inventors: Won Kyu Choi, Daejeon (KR); Jeong Seok Kim, Daejeon (KR); Gil Young Choi, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 403 days.

(21) Appl. No.: 12/135,886

(22) Filed: Jun. 9, 2008

(65) Prior Publication Data

US 2009/0096582 A1    Apr. 16, 2009

(30) Foreign Application Priority Data

Oct. 10, 2007    (KR) .................... 10-2007-0102273

(51) Int. Cl.
*H01Q 1/38* (2006.01)
(52) U.S. Cl. .............................................. 343/700 MS
(58) Field of Classification Search .......... 343/700 MS, 343/702, 833, 834, 846, 848, 850
See application file for complete search history.

(56) References Cited

U.S. PATENT DOCUMENTS

| | | | |
|---|---|---|---|
| 5,008,681 A * | 4/1991 | Cavallaro et al. ..... | 343/700 MS |
| 6,028,564 A | 2/2000 | Duan et al. | |
| 6,215,402 B1 | 4/2001 | Rao Kodukula et al. | |
| 6,285,342 B1 | 9/2001 | Brady et al. | |
| 6,421,014 B1 * | 7/2002 | Sanad ................. | 343/700 MS |
| 6,509,880 B2 | 1/2003 | Sabet et al. | |
| 6,535,175 B2 | 3/2003 | Brady et al. | |
| 6,788,257 B2 * | 9/2004 | Fang et al. ............ | 343/700 MS |
| 7,557,757 B2 * | 7/2009 | Deavours et al. ...... | 343/700 MS |

FOREIGN PATENT DOCUMENTS

| | | |
|---|---|---|
| KR | 10-2000-0055975 A | 9/2000 |
| KR | 20-0348650 | 4/2004 |
| KR | 20-0385306 | 5/2005 |

OTHER PUBLICATIONS

Byunggil Yu, et al., "RFID Tag Antenna Using Two-Shorted Microstrip Patches Mountable on Metallic Objects", Microwave and Optical Technology Letters, vol. 49, No. 2, Feb. 2007.

* cited by examiner

*Primary Examiner*—Hoang V Nguyen
(74) *Attorney, Agent, or Firm*—Kile Park Goekjian Reed & McManus PLLC (57) ABSTRACT

An antenna attached to an object and transmitting electromagnetic waves that are modulated by an RFID tag chip includes a polygonal dielectric material layer that is adjacent to the object, a microstrip patch that determines a resonance frequency of the antenna, a microstrip line that is electromagnetically coupled with the microstrip match, and a shorting pin that disconnects the object and the microstrip line. Accordingly, a small-sized antenna that can be attached to metal can be realized.

9 Claims, 8 Drawing Sheets

RADIO FREQUENCY IDENTIFICATION TAG ANTENNA USING PROXIMITY COUPLING FOR ATTACHING TO METAL

CROSS-REFERENCE TO RELATED APPLICATION

This application claims priority to and the benefit of Korean Patent Application No. 10-2007-0102273 filed in the Korean Intellectual Property Office on Oct. 10, 2007, the entire contents of which are incorporated herein by reference.

BACKGROUND OF THE INVENTION (a) Field of the Invention

The present invention relates to a radio frequency identification tag for attaching to metal. More particularly, it relates to a radio frequency identification tag antenna for attaching to metal by using proximity coupling.

The present invention was supported by the IT R&D program of MIC/IITA [2006-S-023-02, Development of Advanced RFID System Technology].

(b) Description of the Related Art

A radio frequency identification (RFID) tag is used in various fields such as distribution and material handling industries together with an RFID reader.

When an object to which the RFID tag is attached accesses a read zone of the RFID reader, the RFID reader transmits an interrogation signal to the RFID tag by modulating an RF signal having a specific carrier frequency and the RFID tag responds to the interrogation of the RFID reader.

That is, the RFID reader transmits an interrogation signal to the RFID tag by modulating a continuous electromagnetic wave having a specific frequency, and the RFID tag transmits back the electromagnetic wave transmitted from the RFID reader after performing back-scattering modulation in order to transmit its own information stored in the RFID tag's internal memory. The back-scattering modulation is a method for transmitting tag information by modulating the amplitude and/or the phase of a scattered electromagnetic wave when the RFID tag transmits the electromagnetic wave that is initially transmitted from the RFID reader back to the RFID reader by scattering the electromagnetic wave.

Since a passive RFID tag does not include a separate operation power source, it rectifies the electromagnetic wave transmitted from the RFID reader and uses the rectified electromagnetic wave as its own power source to acquire operation power. The intensity of the electromagnetic wave transmitted from the RFID reader should be larger than a specific threshold value for normal operation. However, since the transmission power of the reader is limited by local regulations of each country, it is not possible to unconditionally raise the level of transmission power.

Therefore, the RFID tag should efficiently receive the electromagnetic wave transmitted from the RFID reader to extend the read zone without raising the transmission power level of the reader. A method for raising the receiving efficiency of the RFID tag is to perform complex conjugate matching of an RFID tag antenna and a radio frequency (RF) front-end of the RFID tag chip so as to maximize the intensity of the signal received by the RFID tag.

A conventional antenna will be described in detail with reference to FIG. 1.

Figure 1:
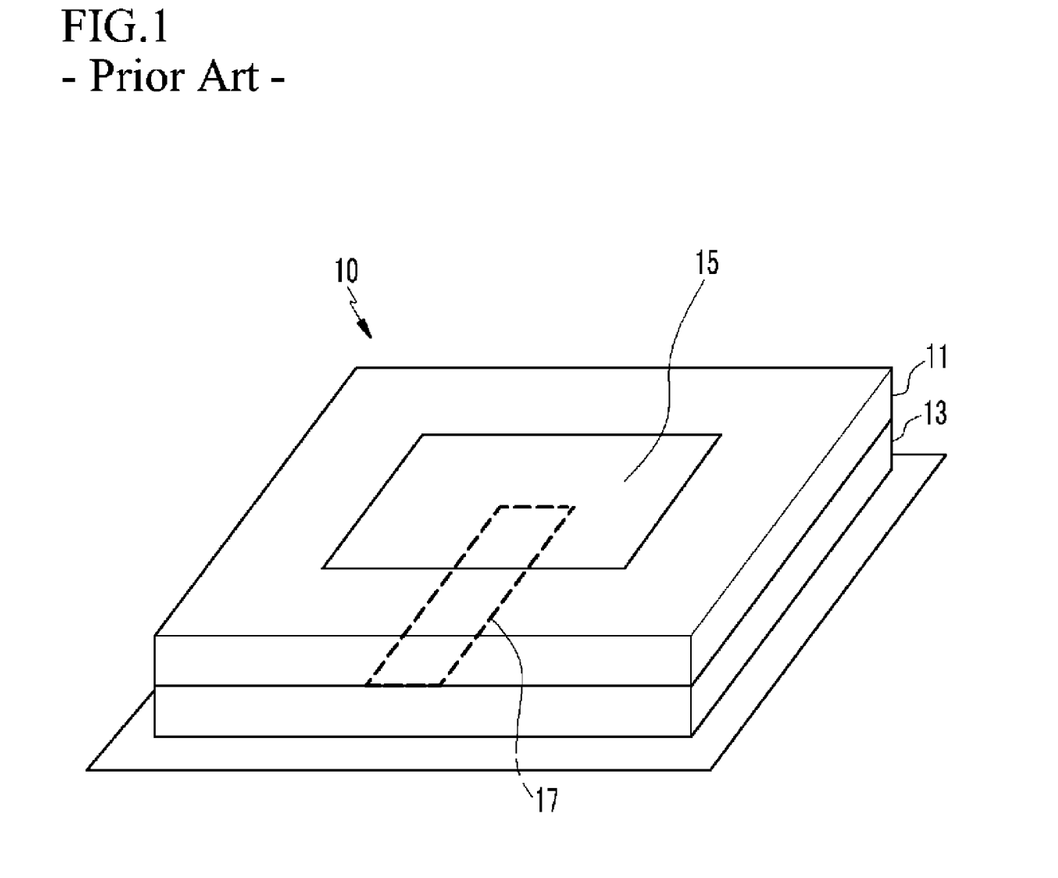
FIG. 1 is a configuration of a conventional antenna.

FIG. 1 is a configuration of a conventional antenna.

As shown in FIG. 1, the conventional antenna 10 includes a first dielectric material layer 11, a second dielectric material layer 13, a microstrip patch 15, and a microstrip line 17.

Both of the first dielectric material layer 11 and the second dielectric material layer 13 have low dielectric constants, and they are formed by accumulation. In this instance, the second dielectric material layer 13 is formed below the first dielectric material layer 11, and a ground surface is formed in a bottom surface of the second dielectric material layer 13.

The microstrip patch 15 is formed in a part of an upper surface of the first dielectric material layer 11, and determines a resonance frequency of the antenna.

The microstrip line 17 is formed in a part of an upper surface of the second dielectric material layer 13.

In design of the conventional antenna 10, the first dielectric material layer 11 and the second dielectric material layer 13 are stacked in order to feed the microstrip patch 15 by way of electromagnetic coupling. Accordingly, the microstrip line 17 and the microstrip patch 15 are excited by way of the electromagnetic coupling.

However, a method for controlling the impedance characteristic of the antenna is not considered in the design of the conventional antenna in FIG. 1.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an antenna having an advantage of increasing intensity of a signal received by a radio frequency identification (RFID) tag through matching impedance of the antenna with impedance of an RFID tag chip.

To achieve the above-described object, according to an exemplary embodiment of the present invention, an antenna is attached to an object and transmits electromagnetic waves that are modulated by an RFID tag chip, and includes a polygonal dielectric material layer, a microstrip patch, a microstrip line, and a shorting pin. The dielectric material layer includes a first side that is adjacent to the object and a second side that is parallel with the first side. The microstrip patch is formed in a part of the second side of the dielectric material layer, and determines a resonance frequency of the antenna. The microstrip line is formed in a part of the second side of the dielectric material layer, is designed as a polygon including a meandering structure, and is electromagnetically coupled with the microstrip patch. The shorting pin is formed inside the dielectric material layer, and disconnects the first side of the dielectric material layer and the microstrip line.

Impedance of the antenna is conjugate-matched with impedance of the RFID tag chip.

A relative dielectric constant of the dielectric material layer is greater than 30.

The microstrip patch includes an empty slot formed in a part of the microstrip patch, and the microstrip line is formed in a part of the slot.

The resonance frequency corresponds to an area that corresponds to the area of the microstrip patch, excluding the area of the slot.

The microstrip line is divided into a first section extended in one direction from an end of the microstrip line, a second section bent at an end of the first section and extended therefrom, a third section extended in the form of a meandering shape from an end of the second section, and a fourth section extended to the same direction as the second section from an end of the third section.

A reactance component of the impedance of the antenna corresponds to a circumference length of the second section, the third section, and the fourth section.

The shorting pin connects a part of the first section and the first side of the dielectric material layer.

A resistance component of the impedance of the antenna corresponds to a distance from the shorting pin to a boundary of the first and second sections.

According to the exemplary embodiment of the present invention, intensity of a signal received by an RFID tag antenna that can be conjugate-matched with the impedance of the RFID tag chip that has a plurality of complex impedances.

Further, according to the exemplary embodiment of the present invention, a small-sized RFID tag antenna can be realized by using a ceramic dielectric material layer.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

A radio frequency identification (RFID) tag antenna according to an exemplary embodiment of the present invention will be described with reference to the accompanying drawings.

A radio frequency identification (RFID) tag that includes an RFID tag antenna according to an exemplary embodiment of the present invention will be described in detail with reference to FIG. 2 to FIG. 4.

Figure 2:
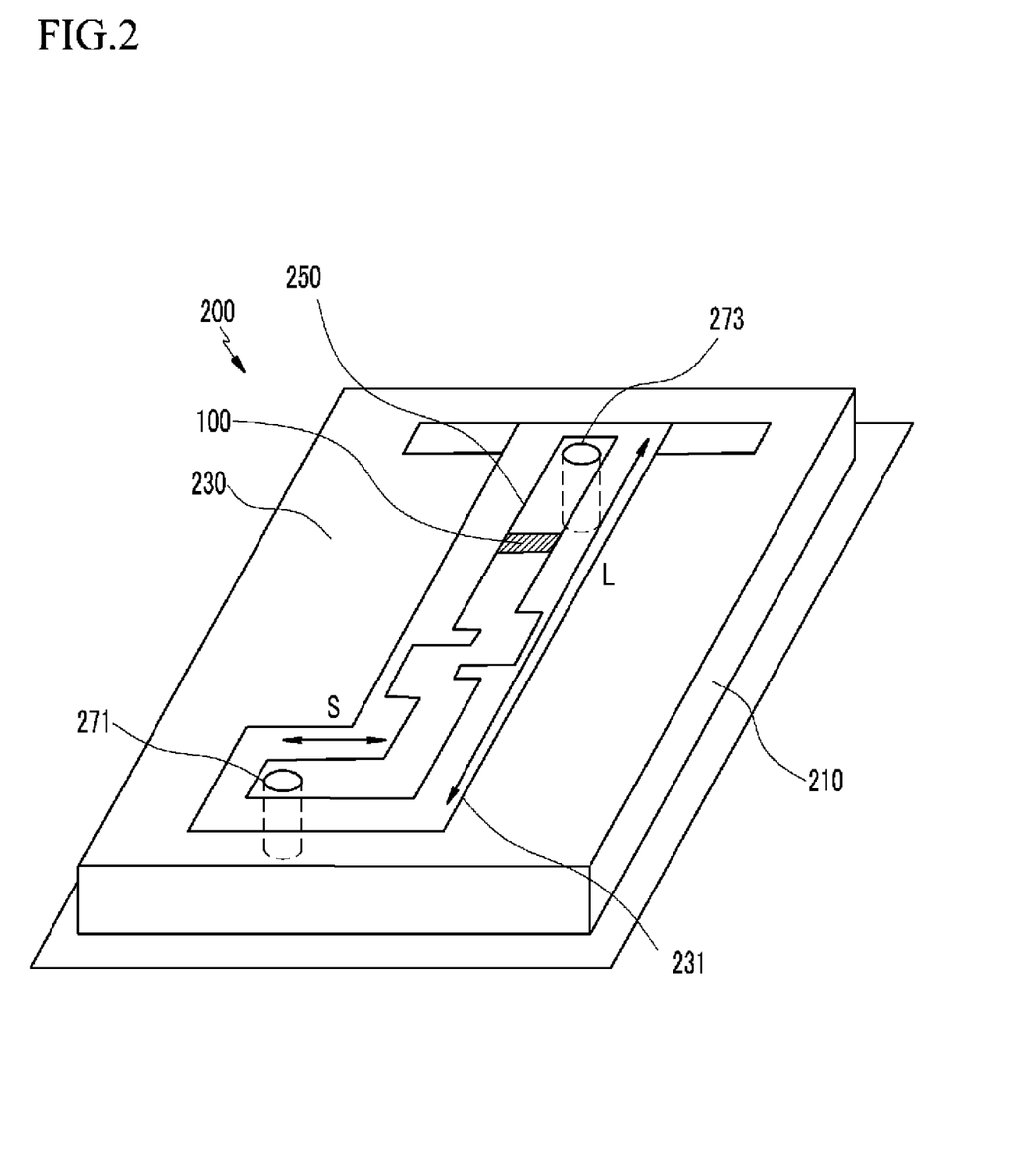
FIG. 2 is a diagram representing a configuration of a radio frequency identification (RFID) tag according to an exemplary embodiment of the present invention.

FIG. 2 shows a configuration of the RFID tag according to the exemplary embodiment of the present invention.

As shown in FIG. 2, the RFID tag according to the exemplary embodiment of the present invention includes an RFID tag chip 100 and an RFID tag antenna 200.

The RFID tag chip 100 stores information on an object to which the RFID tag is attached, and modulates the amplitude and/or the phase of electromagnetic waves transmitted from an RFID reader for transmitting the information on the object. The RFID tag chip 100 modulates the amplitude and/or the phase of the electromagnetic waves by controlling the amount of power through characteristic impedance. In this instance, the RFID tag chip 100 includes a radio frequency (RF) front-end having random input impedance.

The RFID tag antenna 200 receives an electromagnetic wave that corresponds to a resonance frequency, and scatters the electromagnetic wave that is modulated by the RFID tag chip 100. The RFID tag antenna 200 includes a dielectric material layer 210, a microstrip patch 230, a microstrip line 250, and a plurality of shorting pins 271 and 273.

The dielectric material layer 210 is made of a ceramic material having a relative dielectric constant that is greater than 30, and has a cuboid shape. A bottom surface of the dielectric material layer 210 is a ground surface to be attached to the object. According to the exemplary embodiment of the present invention, the RFID tag antenna can be miniaturized by using the ceramic dielectric material layer 210.

The microstrip patch 230 is formed in a part of an upper surface of the dielectric material layer 210, and a slot 231 is formed in a part of the microstrip patch 230 for feeding the microstrip patch 230.

The microstrip patch according to the exemplary embodiment of the present invention will now be described in detail with reference to FIG. 3.

Figure 3:
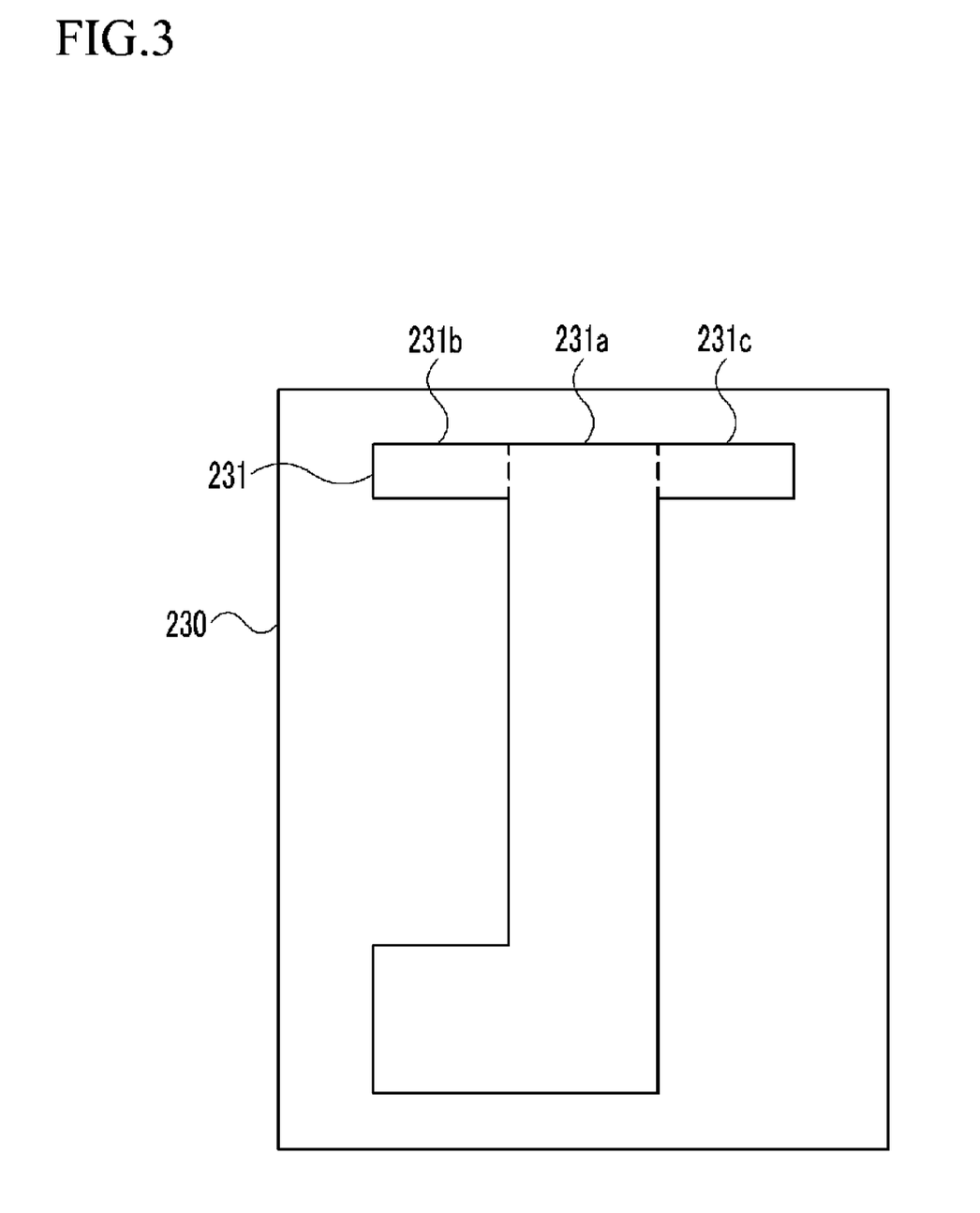
FIG. 3 is a diagram representing a configuration of a microstrip patch according to the exemplary embodiment of the present invention.

FIG. 3 shows a structure of the microstrip patch according to the exemplary embodiment of the present invention.

As shown in FIG. 3, the microstrip patch 230 has a quadrangle shape, and a polygonal-shaped slot 231 is formed in a part of the microstrip patch 230. An internal space of the slot 231 is empty, and the microstrip line 250 is formed in a part of the slot 231. Since the internal space of the slot 231 is empty, the microstrip line 250 is formed in a part of the dielectric material layer 210.

The slot 231 includes a first space 231a for the microstrip line 250, and second and third second spaces 231b and 231c for determining a resonance frequency of the RFID tag antenna 200.

The first space 231a is a polygon that is vertically bent corresponding to the shape of the microstrip line 250.

The second space 231b and the third space 231c are respectively formed in lateral sides of an upper end portion of the first space 231a, forming a quadrangle shape, as shown in FIG. 3.

A resonance frequency of the RFID tag antenna 200 is determined in accordance with an area of the microstrip patch 230, excluding the area of the slot 231.

Accordingly, the area of the microstrip patch 230 is reduced through the second space 231b and the third space 231c so that the RFID tag antenna 200 can resonate at the resonance frequency.

Referring to FIG. 2, an RFID tag including an RFID tag antenna according to the exemplary embodiment of the present invention will be described in detail.

The microstrip line 250 is formed in a part of the first space 231a of the slot 231, and has a polygon shape including a meandering structure. The RFID tag chip 100 is placed in a terminal portion of the microstrip line 250.

The microstrip line according to the exemplary embodiment of the present invention will be described with reference to FIG. 4.

Figure 4:
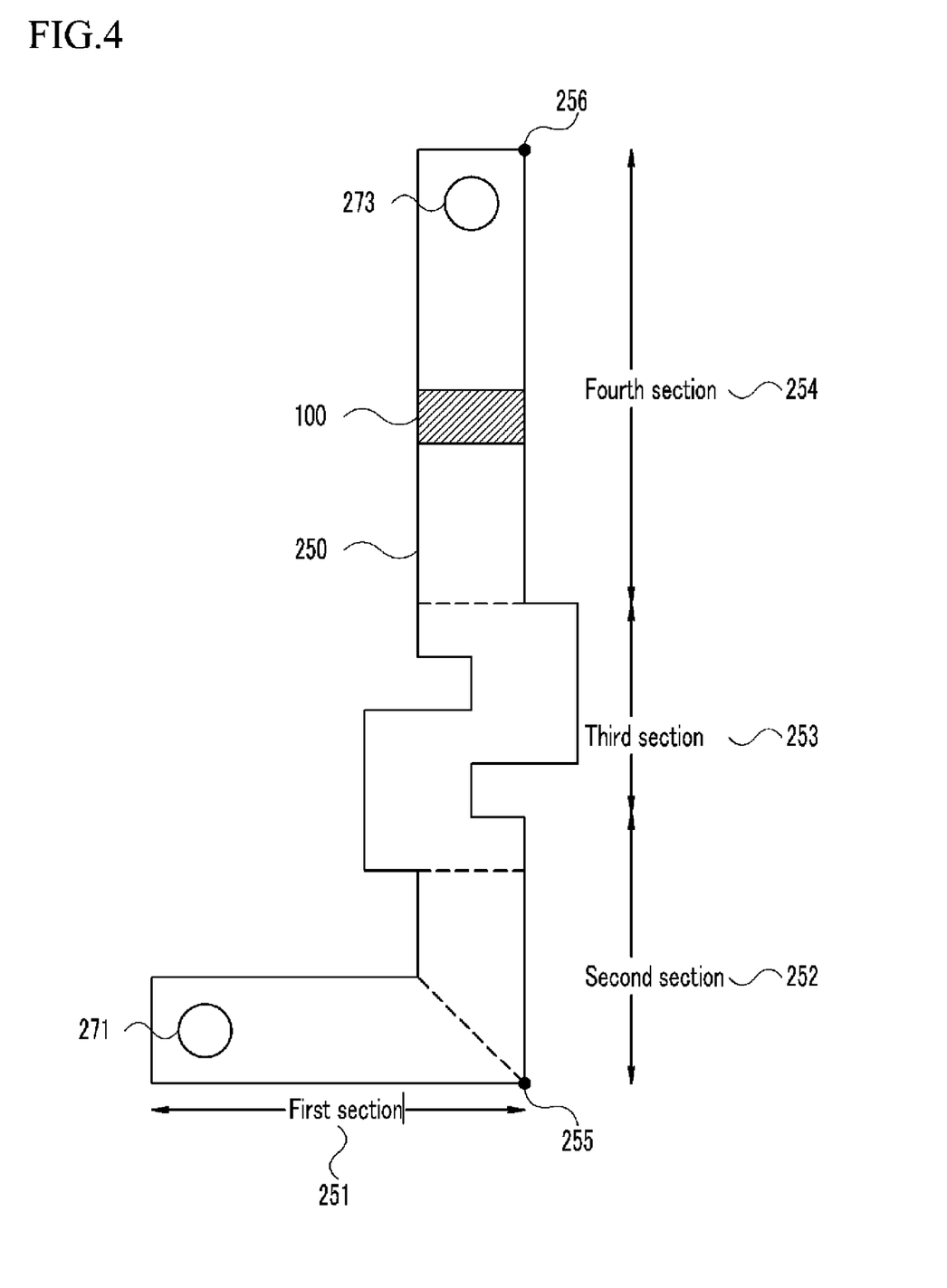
FIG. 4 is a diagram representing a configuration of a microstrip line according to the exemplary embodiment of the present invention.

FIG. 4 shows a structure of the microstrip line according to the exemplary embodiment of the present invention.

As shown in FIG. 4, the microstrip line 250 according to the exemplary embodiment of the present invention is divided into a first section 251, a second section 252, a third section 253, and a fourth section 254, and includes a first bending point 255 for dividing the first section 251 and the second section 252, and a second bending point 256 that corresponds to an end portion of the microstrip line 250.

The microstrip line 250 is extended to one direction to form the first section 251, and is bent at an end portion of the first section 251 and then extended to form the second section 252 therefrom. The third section 253 is formed by being extended in a meandering shape from an end portion of the second section 252, and the fourth section 254 is extended to the same direction as the second section 252 is extended from an end portion of the third section 253.

Since the third section 253 of the microstrip line 250 is formed in the meander shape, a circumference length L from the first bending point 255 to the second bending point 256 can be extended.

Referring to FIG. 2, the RFID tag including the RFID tag antenna according to the exemplary embodiment of the present invention will be described in more detail.

The shorting pins 271 and 273 are formed inside the dielectric material layer 210, and each of the shorting pins 271 and 273 disconnects lateral ends of the microstrip line 250 and a ground surface. In this instance, the shorting pin 271 connects a part of the first section 251 of the microstrip line 250 with the ground surface, and the shorting pin 273 connects a part of the fourth section 254 and the ground surface.

In the RFID tag antenna 200, the microstrip patch 230 and the microstrip line 250 are electromagnetically coupled, and the electromagnetic coupling serves as an impedance transformer.

In the design of the RFID tag antenna 200 according to the exemplary embodiment of the present invention, a distance S between the microstrip line 250 and the boundary of the first and second sections 251 and 252 can be changed by changing a location of the shorting pin 271 so as to control a resistance component of the impedance of the RFID tag antenna 200.

In addition, in the design of the RFID tag antenna 200 according to the exemplary embodiment of the present invention, a reactance component of the impedance of the RFID tag antenna 200 can be controlled by changing a circumference length L of the microstrip line 250. The circumference line L is a distance between the first bending point 255 and the second bending point 256.

Further, in the design of the RFID tag antenna 200 according to the exemplary embodiment of the present invention, a resonance frequency of the RFID tag antenna 200 can be controlled by changing the size of the second space 231b of the slot 231 and the size of the third space 231b of the slot 231.

An equivalent circuit of the RFID tag antenna and the RF front-end of the RFID tag chip according to the exemplary embodiment of the present invention will now be described with reference to FIG. 5.

Figure 5:
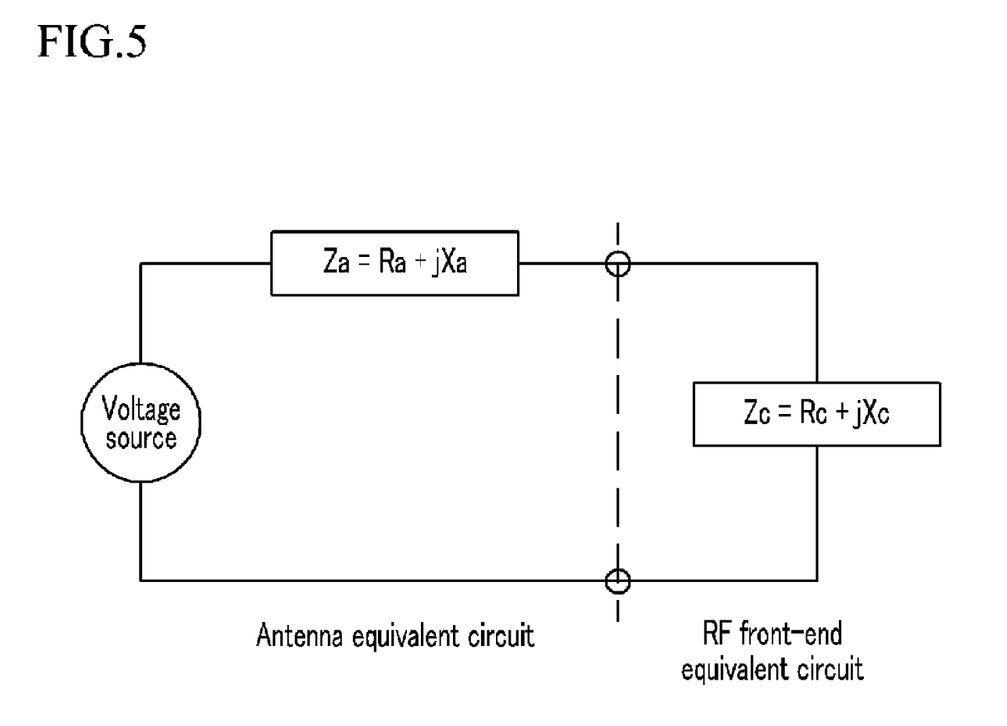
FIG. 5 shows an equivalent circuit of a radio frequency identification (RFID) tag antenna and a radio frequency (RF) front-end according to the exemplary embodiment of the present invention.

FIG. 5 shows the equivalent circuit of the RFID tag antenna and the RF front-end of the RFID tag chip according to the exemplary embodiment of the present invention.

As shown in FIG. 5, the equivalent circuit includes a voltage source, impedance of the RFID tag antenna 200, and impedance of the RF front-end. The voltage source and the impedance $Z_a$ of the RFID tag antenna 200 is an equivalent circuit of the RFID tag antenna 200 and the impedance $Z_c$ of the RF front-end is an equivalent circuit of the RF front-end.

The impedance $Z_a$ of the RFID tag antenna 200 includes a real part $R_a$ and an imaginary part $X_a$, and the impedance $Z_c$ of the RF front-end includes a real part $R_c$ and an imaginary part $X_c$.

In this instance, the maximum power is transmitted to the RF front-end of the RFID tag chip from the RFID tag antenna 200 when the impedance $Z_a$ of the RFID tag antenna 200 and the impedance $Z_c$ of the RF front-end are as shown in Equation 1.

$$R_a = R_c$$
$$X_a = -X_c \qquad \text{[Equation 1]}$$

A typical impedance value of a RF front-end is 50Ω, but the RF front-end according to the exemplary embodiment of the present invention has a random complex value. That is, the impedance $Z_c$ of the RF front-end has a relatively small resistance component $R_c$ and a relatively large capacitive reactance component $X_c$. Therefore, the impedance $X_a$ of the antenna should have a small resistance component $R_a$ and a large inductive reactance component $X_a$, and should simultaneously resonate at a corresponding frequency.

The RFID tag antenna 200 according to the exemplary embodiment of the present invention can be designed to be conjugate matching with the impedance $Z_c$ of the RF front-end by controlling the impedance $Z_a$ of the RFID tag antenna 200 by changing the circumference length L and the distance S that indicates the location of the shorting pin 271.

Impedance variation of the RFID tag antenna according to the exemplary embodiment of the present invention will now be described with reference to FIG. 6 and FIG. 7.

Figure 6:
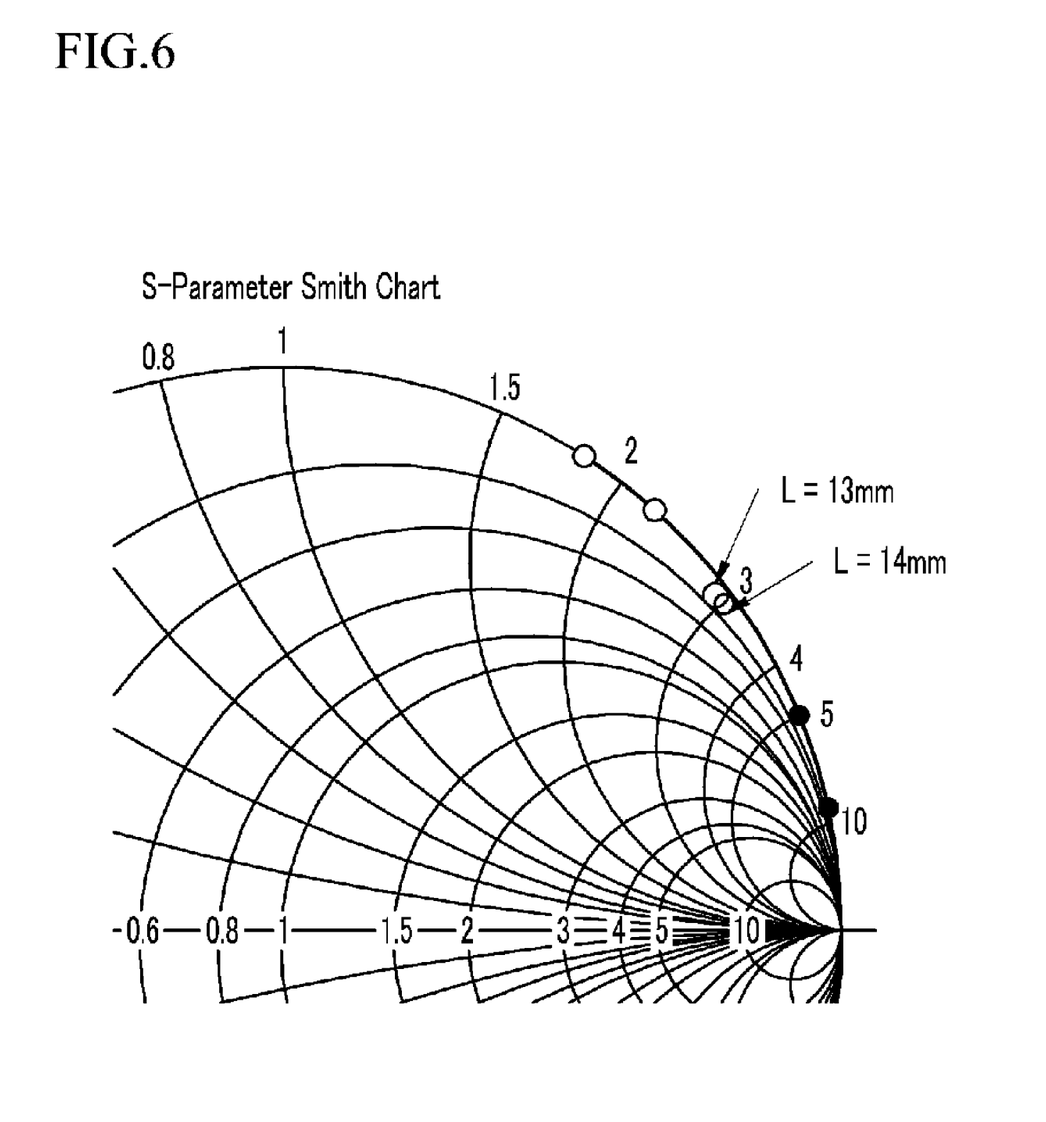
FIG. 6 shows impedance variation with change of line length variation according to the exemplary embodiment of the present invention.

FIG. 6 shows impedance variation with a change of the length of the microstrip line 250 according to the exemplary embodiment of the present invention. Particularly, variation of the impedance $Z_a$ of the RDIF tag antenna 200 with a change of the circumference length L of the microstrip line 250 is marked on the Smith chart of FIG. 6.

As shown in FIG. 6, when the circumference length L is changed from 13 mm to 14 mm, the resistance component $R_a$ of the impedance $Z_a$ of the RFID tag antenna 200 is maintained at a constant level but the reactance component $X_a$ is increased.

Figure 7:
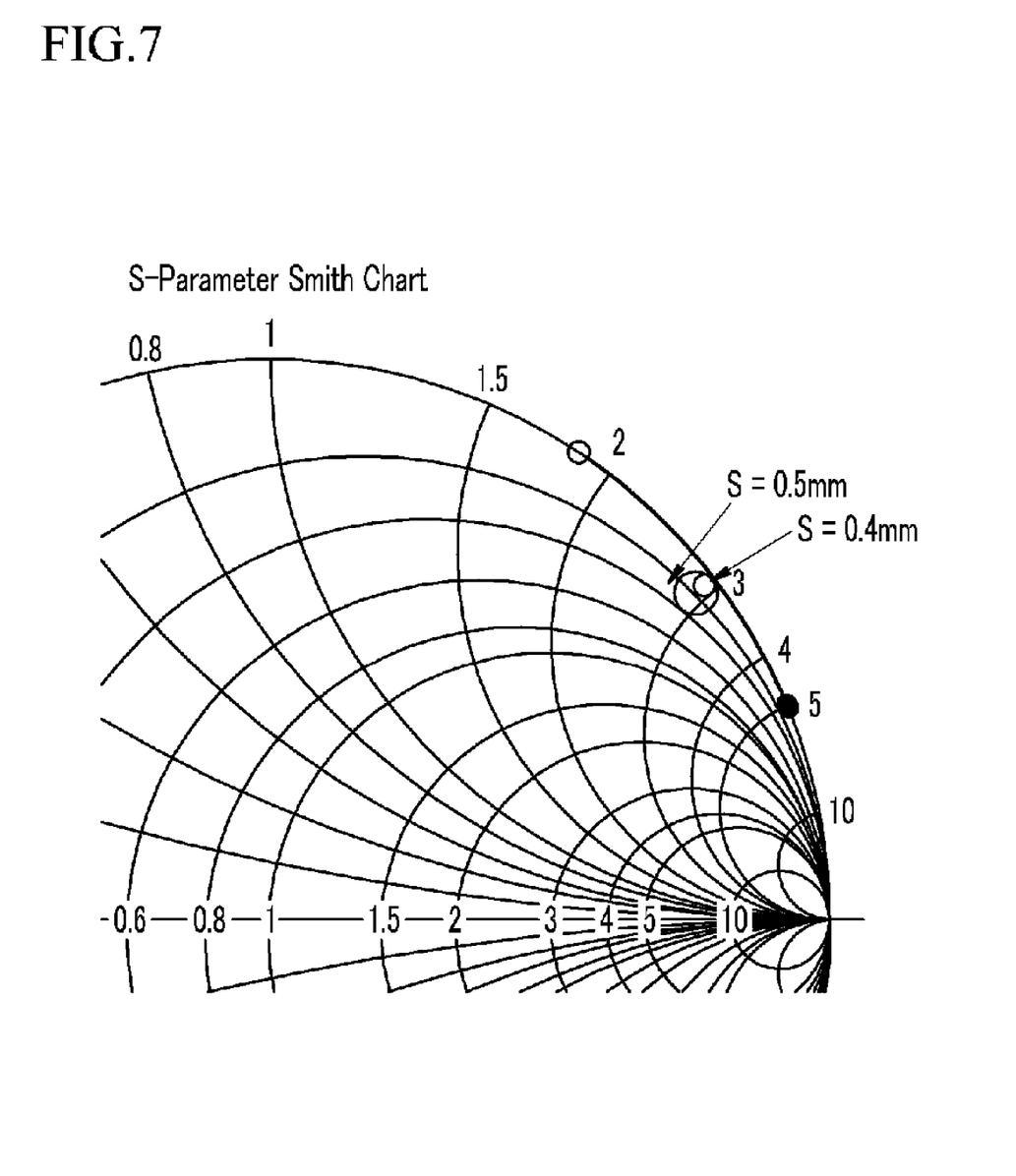
FIG. 7 shows impedance variation with a change of shorting pin location according to the exemplary embodiment of the present invention.

FIG. 7 shows impedance variation with a change of the location of the shorting pin according to the exemplary embodiment of the present invention. Particularly, the variation of the impedance $Z_a$ with a change of the distance S that determines the location of the shorting pin 271 is marked on the Smith chart of FIG. 7.

As shown in FIG. 7, when the distance S is changed from 0.4 mm to 0.5 mm, the reactance component $X_a$ of the impedance $Z_a$ of the RFID tag antenna 200 is maintained at a constant level, but the resistance component $R_a$ is increased.

A return loss between the RFID tag antenna and the RFID tag chip according to the exemplary embodiment of the present invention will be described with reference to FIG. 8.

Figure 8:
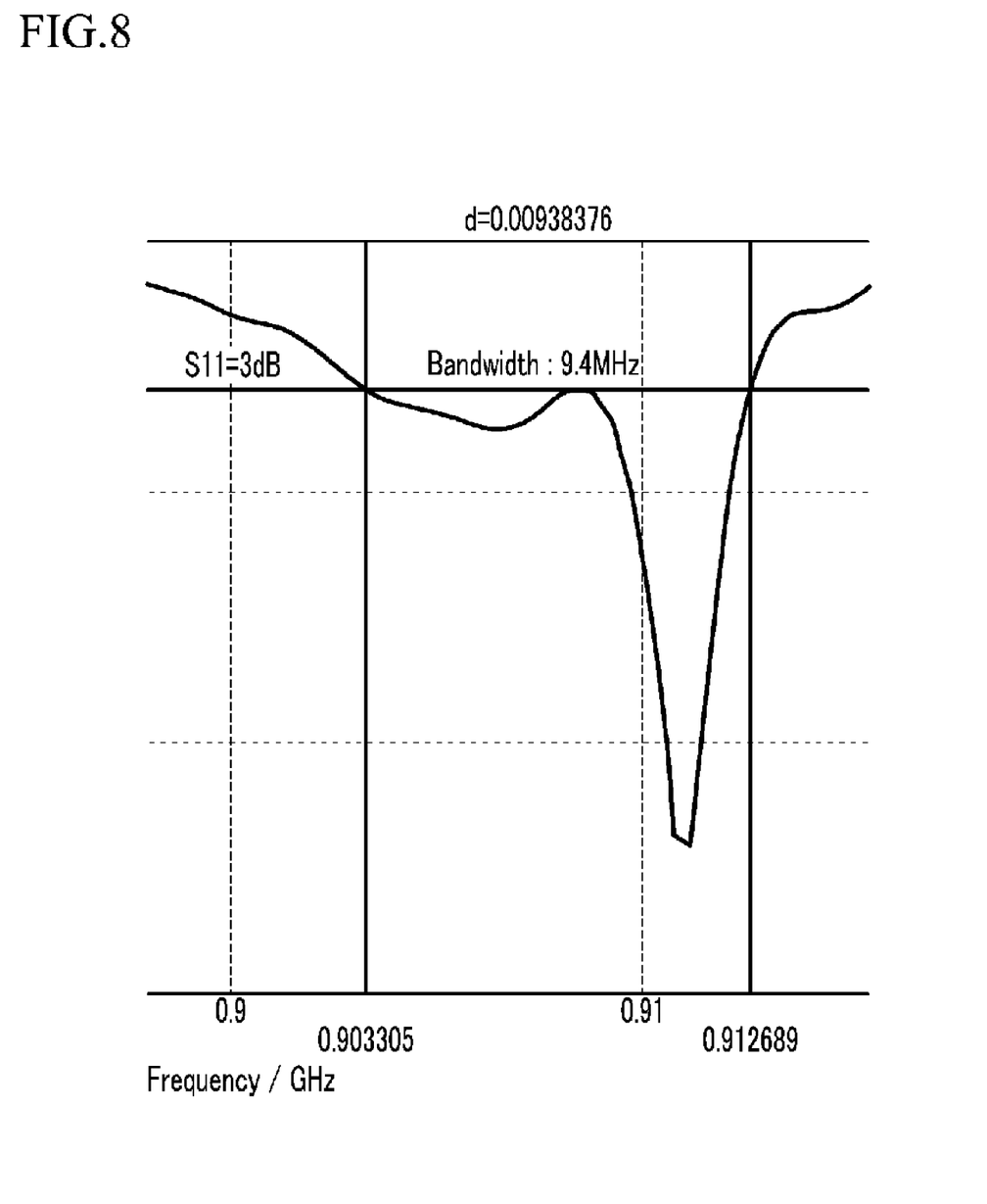
FIG. 8 shows a return loss of the RFID tag according to the exemplary embodiment of the present invention.

FIG. 8 shows a return loss in the RFID tag antenna according to the exemplary embodiment of the present invention.

As shown in FIG. 8, an operation bandwidth of the RFID tag antenna 200 is 9.4 MHz with reference to return loss of 3 dB when the volume of the RFID tag antenna 200 is 20 mm×24 mm×3 mm and a relative dielectric constant of the ceramic dielectric material is 37.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An antenna attached to an object and transmitted electromagnetic waves that are modulated by a radio frequency identification (RFID) tag chip, the antenna comprising:
   a polyhedral dielectric material layer comprising a first side that is adjacent to the object and a second side that is parallel with the first side;
   a microstrip patch formed in a part of the second side of the dielectric material layer, and determining a resonance frequency of the antenna;
   a microstrip line formed in a part of the second side of the dielectric material layer, designed as a polygon including a meandering structure, and electromagnetically coupled with the microstrip patch; and
   a shorting pin firmed inside the dielectric material layer, and disconnecting the first side of the dielectric material layer and the microstrip line.

2. The antenna of claim 1, wherein impedance of the antenna is conjugate-matched with impedance of the RFID tag chip.

3. The antenna of claim 2, wherein a relative dielectric constant of the dielectric material layer is greater than 30.

4. The antenna of claim 1, wherein the microstrip patch comprises an empty slot formed in a part of the microstrip patch, and the microstrip line is formed in a part of the slot.

5. The antenna of claim 4, wherein the resonance frequency corresponds to an area that corresponds to the area of the microstrip patch, excluding the area of the slot.

6. The antenna of claim 1, wherein the microstrip line comprises:
   a first section extended to one direction from an end of the microstrip line;
   a second section bent at an end of the first section and extended therefrom;
   a third section extended in the form of a meandering shape from an end of the second section; and
   a fourth section extended to the same direction as the second section from an end of the third section.

7. The antenna of claim 6, wherein a reactance component of the impedance of the antenna corresponds to a circumference length of the second section, the third section, and the fourth section.

8. The antenna of claim 6, wherein the shorting pin connects a part of the first section and the first side of the dielectric material layer.

9. The antenna of claim 8, wherein a resistance component of the impedance of the antenna corresponds to a distance from the shorting pin to a
   boundary of the first and second sections.

* * * * *